Nov. 14, 1944.                W. O. BECHMAN                2,362,443
                             LUBRICATING MEANS
              Original Filed June 16, 1941    2 Sheets-Sheet 1

Inventor:
William O. Bechman
By: Paul O. Pippel
Atty.

Nov. 14, 1944.   W. O. BECHMAN   2,362,443
LUBRICATING MEANS
Original Filed June 16, 1941   2 Sheets-Sheet 2
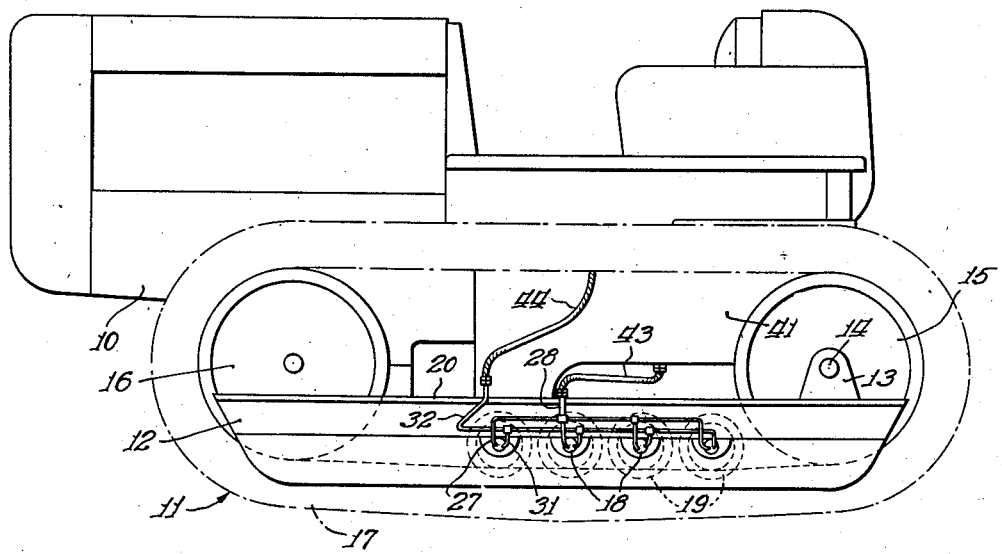
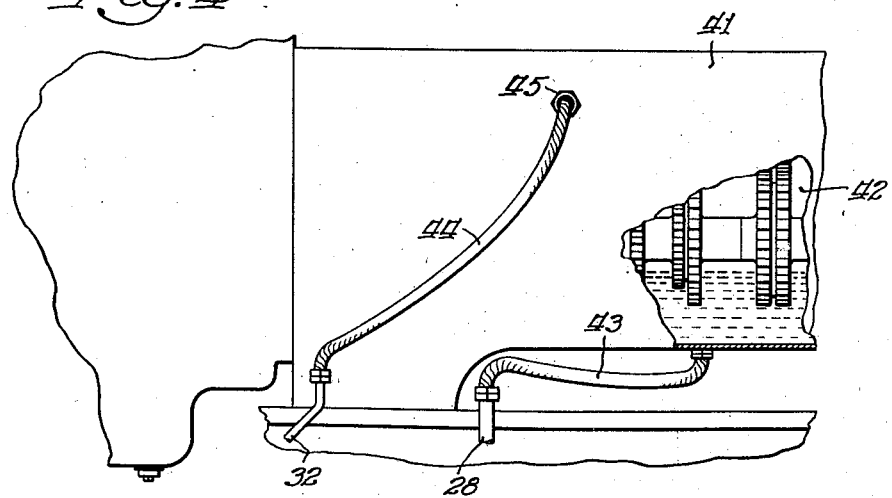
Inventor:
William O. Bechman
By: Paul O. Pippel
Atty.

Patented Nov. 14, 1944

2,362,443

UNITED STATES PATENT OFFICE 2,362,443

LUBRICATING MEANS

William O. Bechman, Chicago, Ill., assignor to International Harvester Company, a corporation of New Jersey Original application June 16, 1941, Serial No. 398,206. Divided and this application October 26, 1942, Serial No. 463,353

3 Claims. (Cl. 184—7)

This invention relates to a lubricating system and, more particularly, to a lubricating system in which means are provided for lubricating a bearing surface in conjunction with means providing for a return or venting of the lubricant from the bearing surface. This application is a division of my application Serial No. 398,206, filed June 16, 1941, now Patent No. 2,349,898, entitled "Lubricating means."

One particular instance in which the invention finds its greatest utility is in connection with the lubrication of the track rollers of a track-type tractor. In such a tractor, a tractor body is carried between a pair of track-laying mechanisms, each of which comprises a pair of longitudinally extending track frames carrying a plurality of track rollers. Each track roller is mounted on a shaft disposed horizontally of the track frame. A substantial part of the weight of the tractor is carried on the track rollers, which engage the track chains which in turn rest upon the ground.

Because of the unusual conditions under which a track-type tractor is operated, extraordinary lubrication problems arise. Most of the failures of the track rollers to receive proper lubrication can be traced to the neglect on the part of the person servicing the tractor to determine correctly whether the rollers have received the proper supply of lubricant. This neglect is due in most instances to the inability of the service man to inspect the rollers, with the result that the tractor is often operated while certain of the rollers have received little or no lubricant.

One particular problem attendant upon the lubrication of track rollers is that certain of the rollers lose their lubricant because of failure of the track seals to maintain the lubricant therein against the expansion of the lubricant caused by overheating of the rollers. Accordingly, certain of the rollers become worn out before others and require either replacement or special care in connection with the lubrication thereof in the event that immediate replacement is not possible. One of the usual methods for lubricating rollers involves the supply of lubricant for a certain period of time, after which period it is assumed that the roller is properly lubricated. It will be seen, however, that a roller which is nearly worn out will require greater quantities of lubricant than a roller in better condition.

The invention contemplates and has for its principal object the provision of means insuring the proper lubrication to the track rollers of a track-type tractor.

Another object of the invention is the provision on the tractor of a lubricant reservoir having conduits leading to the rollers, each roller in turn being provided with a return conduit for venting the roller to accommodate expansion of the air and lubricant within the roller upon overheating of the roller.

Another object is to utilize a lubricant-containing part of the tractor as a supply means or reservoir. Specifically, an object is to utilize the transmission casing of the tractor as a reservoir.

A further understanding of the foregoing and other desirable objects and features of the invention may be had from the following detailed description taken in conjunction with the accompanying sheets of drawings, in which:

Figure 3 is a view similar to that in Figure 1, but which illustrates a modified form of the invention in which the tractor transmission casing is utilized as the lubricant-supply reservoir; and Figure 4 is an enlarged fragmentary and sectional view illustrating the lubricant-supply connections to the casing.

Although the invention has been illustrated in connection with the track rollers of a track-type tractor, it is to be understood that in its broader aspects the invention embodies fundamental principles that are capable of application to other structures and uses, and, accordingly, it is not desired that the invention be limited to the preferred forms illustrated and described.

Figure 1:
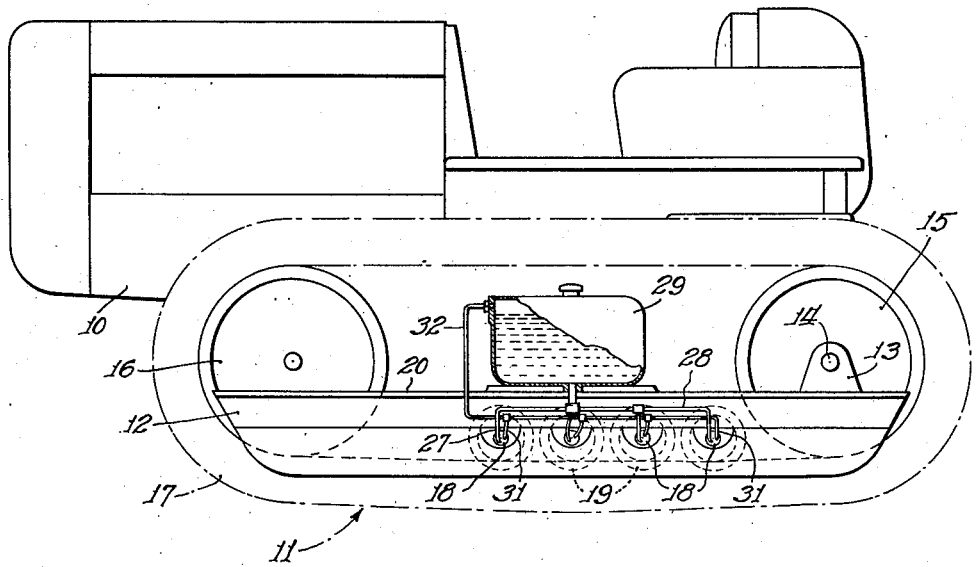
Figure 1 is a side elevational view, showing a track-type tractor including a preferred form of the invention as applied to the problem of lubricating the track rollers of the tractor.

The tractor chosen for the purposes of illustration, as shown in Figure 1, comprises generally a longitudinal main frame 10 carried on a pair of transversely spaced track mechanisms, only one of which is shown, indicated generally at 11. Each track mechanism includes a longitudinally extending track frame 12, connected at its rear end by a bracket 13 to a transverse shaft 14, on which is carried the tractor drive wheel or sprocket 15. The front end of the track frame is associated in the usual manner with a front idler wheel 16, and a track chain 17 is trained about the wheels 15 and 16.

The track frame 12 carries a plurality of longitudinally spaced, horizontally disposed supports in the form of roller shafts 18, each of which carries a track roller 19. The rollers 19 engage and ride on the inner portions of the track chain 17 and support the tractor in the usual manner.

Figure 2:
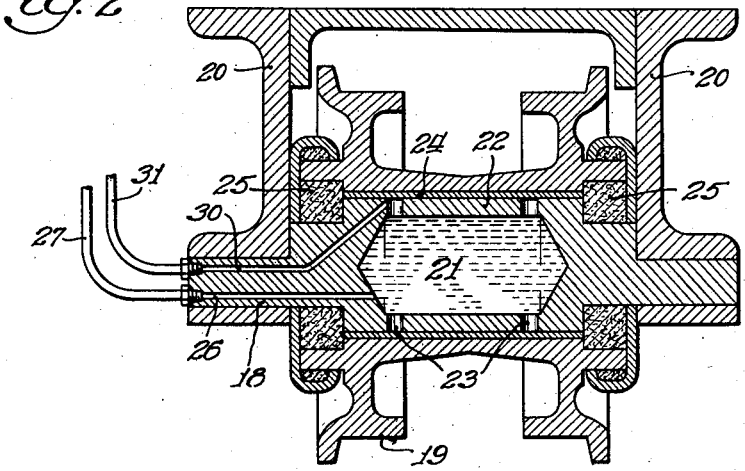
Figure 2 is an enlarged sectional view of one of the track rollers shown in Figure 1.

A typical roller construction is shown in detail in Figure 2, wherein the track frame 12 is shown as comprising a transverse member which cross-connects a pair of longitudinally extending channels 20. The track roller shaft 18 spans the lower portions of the channels 20, and is rigidly and non-rotatably carried thereby, the outer ends of the shaft being reduced and flattened for that purpose. In the particular form of construction illustrated, the central portion of the shaft 18 is enlarged to form a pocket or chamber 21 to provide means for receiving a quantity of lubricant. The chamber is formed in the shaft by a central cylindrical portion including a cylindrical wall 22 which is provided with a plurality of openings or bores 23, communicating with a bearing surface provided between the outer cylindrical surface of the central shaft part and a cylindrical bushing 24. The bushing 24 carries a track roller 19. Opposite end portions of the roller are provided with sealing means 25 which may be of any suitable construction.

The shaft 18 is provided with a generally axially directed bore 26 which communicates between one end of the shaft and the lubricant chamber 21. To this bore or passage is connected a conduit or supply line 27, leading to a common delivery pipe 28 which is associated with the lower portion of a lubricant reservoir in the form of a tank 29 carried on the track frame 12. It will be understood that there is a plurality of conduits 27, one for each of the rollers 19. The means just described provides for an adequate and equalized supply of lubricant to the rollers.

It was previously stated that the track rollers were subject to overheating, under which conditions the lubricant and air in the chambers 21 expanded to a comparatively great extent, with the result that the seals, such as the seals 25, were adversely affected. In order that these conditions may be overcome, the present invention contemplates means for venting the chambers 21. To this end, each shaft 18 is provided with a second bore or passage 30, communicating at one end with the chamber 21 (through an opening 23) and at its other end, with the upper portion of the lubricant reservoir 29. The latter connection is made by means of a conduit 31, leading to a common conduit 32 which is in turn connected to an upper portion of the tank 29. As shown in Figure 1, each of the shafts 18 is provided with a similar conduit 31.

In the modified form of construction illustrated in Figures 3 and 4, the invention in that respect consists of the utilization of a gear housing as the reservoir from which lubricant is supplied to the tractor rollers. In so far as the general tractor construction illustrated in Figure 3 accords with that shown in Figure 1, the reference characters designating the parts are the same.

As shown in Figure 4, an intermediate portion of the tractor body 10 consists of the usual transmission gear housing 41 which forms a chamber 42 adapted to contain a supply of lubricant to the level indicated. Lubricant supply means is connected between the gear housing and the track roller and preferably takes the form of a flexible conduit or hose 43 which is connected at one end to a point in the housing below the lubricant level, and, at its other end, to the common delivery pipe 28 which is connected by means of the plurality of conduits 27 to the passages 26 in the track roller shafts 18. The conduit is preferably flexible because of the relative movement between the tractor body and the track frames. Means is provided for venting the lubricant-containing pockets 21 in the shafts 18 to the chamber 42 in the transmission housing 41 and this means preferably takes the form of a flexible conduit 44 connected at one end, as at 45, to the gear housing and, at its other end, to a common conduit 32 which is connected through the plurality of conduits 31 to the passages 30 in the track roller shafts 18. The connection 45 of the conduit 44 to the transmission housing is above the lubricant contained in the housing. In this respect the principle of the invention herein illustrated is similar to that peculiar to the construction illustrated in Figure 1; that is to say, the venting conduit opens to a portion of the reservoir above the level of the lubricant.

In the use of the construction illustrated in Figures 1 and 2, the reservoir 29 is filled with lubricant to the level indicated. By this means an equal supply of lubricant is insured to each of the rollers 19, assuming that these rollers are in perfect condition. In the event that any one or more of the rollers is worn to a greater extent than any of the others, that roller or rollers will receive an additional supply of lubricant necessary to accommodate the differences due to its worn condition. Inasmuch as the conduits 30 and 31 provide for venting of the chambers 21 back to the tank 29, the supply of lubricant will not be obstructed by air entrapped in the pockets or chambers 21 or in other parts of the system. It has been found, in the operation of tractors of the type illustrated, that the rollers after becoming overheated are often subjected to operating conditions which cause a sudden chilling of the rollers. Such chilling occurs, for example, when the tractor is driven through water deep enough to contact the rollers. Because of the heat generated before chilling, the chambers 21 contain a certain volume of expanded air and lubricant. This volume immediately contracts upon chilling of the roller, with the result that the water is drawn in around the seals 25. Because of the venting provision in the preferred construction illustrated, there is no opportunity for the lubricant and air to form an expanded volume in the chambers 21. Consequently, there is little or no contraction of air, vapor, or lubricant when the rollers are chilled, and, hence, there is little or no suction created on the seals 25. Moreover, because of the continuous supply of lubricant from the reservoir 29, there will be available quantities of oil sufficient to fill the space vacated by whatever contraction of air or vapor does occur.

The functional characteristics of the lubricating system illustrated in Figures 3 and 4 are substantially identical, because of the system illustrated in Figures 1 and 2, the only difference being in the source of lubricant supply. Since these two modifications are very similar in use and operation, it is unnecessary to particularize the use and operation of the modification shown in Figures 5 and 6.

As previously stated, the principles of the present invention are applicable in many instances outside the particular field in which the invention has been herein illustrated. It will be appreciated also that only preferred forms of the invention have been illustrated and described, and that numerous modifications and alterations may be made therein without departing from the spirit and scope of the invention as defined in the appended claims.

What is claimed is:

1. In a tractor of the track-laying type having a body provided with a transmission gear housing adapted to contain lubricant at a level below the top of the housing, said tractor further including a track frame, the combination with the housing and frame of a plurality of track roller means carried by the frame, each including a shaft carried by the frame and having a lubricant pocket and a pair of lubricant passages therein communicating with said pocket, a roller carried by each shaft and rotatable with respect to the frame, a plurality of conduit means connected between the gear housing at a point below the lubricant level therein and one of each of the passages of the shaft to supply lubricant from said housing, and a plurality of conduit means connected between the gear housing at a point above the lubricant level and each of the other passages in the shafts and serving to vent the pockets in the shafts to said housing.

2. In a tractor of the track-laying type including a body having a gear housing adapted to contain lubricant and having a track frame, the combination with the housing and frame of a plurality of track roller means carried by the frame, each including a shaft carried by the frame and having a lubricant pocket and a pair of lubricant passages therein communicating with said pocket, a roller carried by each shaft and rotatable with respect to the frame, a plurality of conduit means connecting the gear housing and one of each of the passages in the shafts to supply lubricant from said housing, and a plurality of conduit means connecting the gear housing and each of the other passages in the shafts and serving to vent the pockets in the shafts to the housing.

3. In a tractor of the track-laying type having a track frame, the combination with the housing and frame of a plurality of track roller means carried by the frame, each including a shaft carried by the frame and having a lubricant pocket and a pair of lubricant passages therein communicating with said pocket, a roller carried by each shaft and rotatable with respect to the frame, lubricant supply means comprising a reservoir carried by the track frame and adapted to contain lubricant, a plurality of conduit means connecting said means and one of each of the passages in the shafts to supply lubricant from the reservoir, and a plurality of conduit means connecting the reservoir above lubricant level and each of the other passages in the shafts and serving to vent the pockets in the shafts to the supply means.

WILLIAM O. BECHMAN.